United States Patent [19]

Reinartz et al.

[11] Patent Number: 4,811,809

[45] Date of Patent: Mar. 14, 1989

[54] TRACTION SLIP CONTROL DEVICE

[75] Inventors: Hans D. Reinartz, Frankfurt am Main; Helmut Steffes, Hattersheim; Joachim Maas, Darmstadt; Thomas Schwarz, Eschenburg, all of Fed. Rep. of Germany

[73] Assignee: Alfred Teves GmbH, Frankfurt am Main, Fed. Rep. of Germany

[21] Appl. No.: 58,423

[22] Filed: Jun. 5, 1987

[30] Foreign Application Priority Data

Jun. 9, 1986 [DE] Fed. Rep. of Germany ....... 3619409
Jul. 11, 1986 [DE] Fed. Rep. of Germany ....... 3623491

[51] Int. Cl.$^4$ .............................................. B60K 28/16
[52] U.S. Cl. ..................................... 180/197; 123/342
[58] Field of Search ................ 180/197, 165, 247; 123/342, 378; 318/52

[56] References Cited

U.S. PATENT DOCUMENTS

| | | | |
|---|---|---|---|
| 2,273,411 | 2/1942 | Maybach | 123/378 |
| 2,585,814 | 2/1952 | McDonald | 123/342 |
| 3,769,951 | 11/1973 | Holl | 123/342 |
| 3,923,020 | 12/1975 | Gilligan | 123/378 X |
| 4,077,370 | 3/1978 | Spangenberg | 123/342 |
| 4,337,743 | 7/1982 | Mattson | 123/342 X |
| 4,589,511 | 5/1986 | Leiber | 180/197 |

FOREIGN PATENT DOCUMENTS

| | | | |
|---|---|---|---|
| 887129 | 8/1953 | Fed. Rep. of Germany | 123/378 |
| 2152114 | 4/1972 | Fed. Rep. of Germany | . |
| 2119248 | 11/1972 | Fed. Rep. of Germany | . |
| 3143666 | 5/1983 | Fed. Rep. of Germany | 180/197 |
| 3237672 | 4/1984 | Fed. Rep. of Germany | 180/197 |
| 79050 | 5/1984 | Japan | 123/342 |
| 971393 | 9/1964 | United Kingdom | 123/342 |
| 2078323 | 1/1982 | United Kingdom | 180/197 |

*Primary Examiner*—Charles A. Marmor
*Assistant Examiner*—Mitchell J. Hill
*Attorney, Agent, or Firm*—James B. Raden

[57] ABSTRACT

The present invention relates to a traction slip control device comprising a sensor which responds to a beginning slip condition on at least one of the driving wheels and, connected to the sensor, a control circuit which via an auxiliary drive in the form of a fluid which actuates the throttle valve of the drive engine in the closing sense when the sensor detects a slip condition and feeds a slip signal to the control circuit.

2 Claims, 4 Drawing Sheets

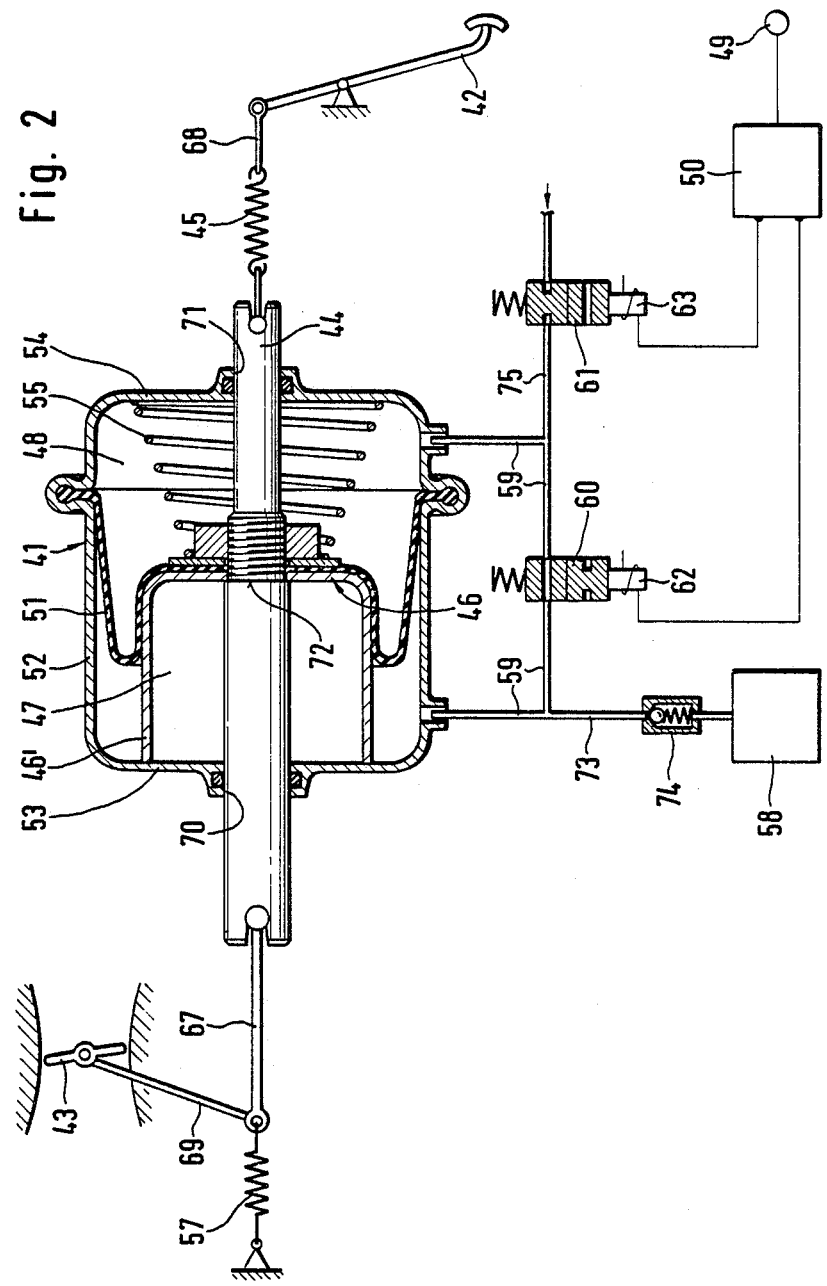

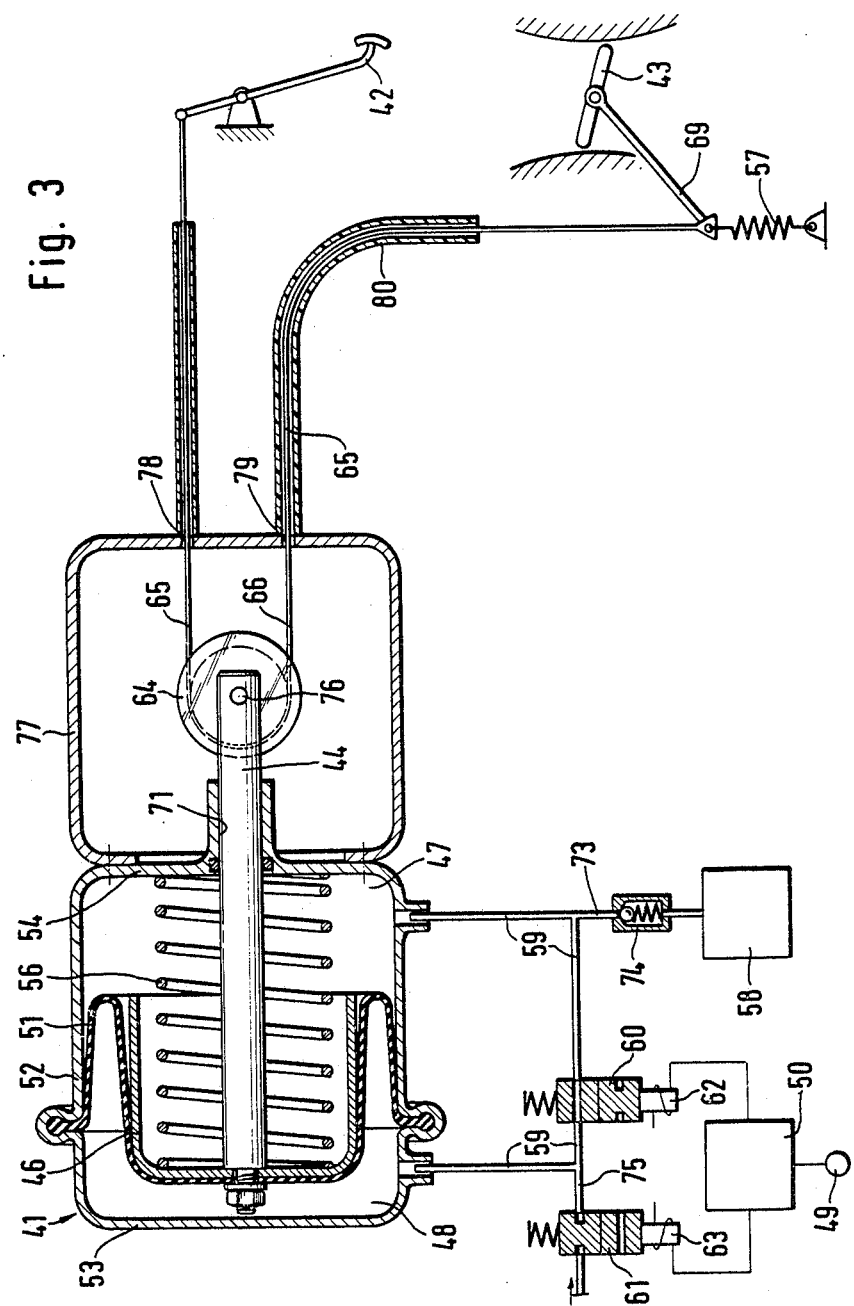

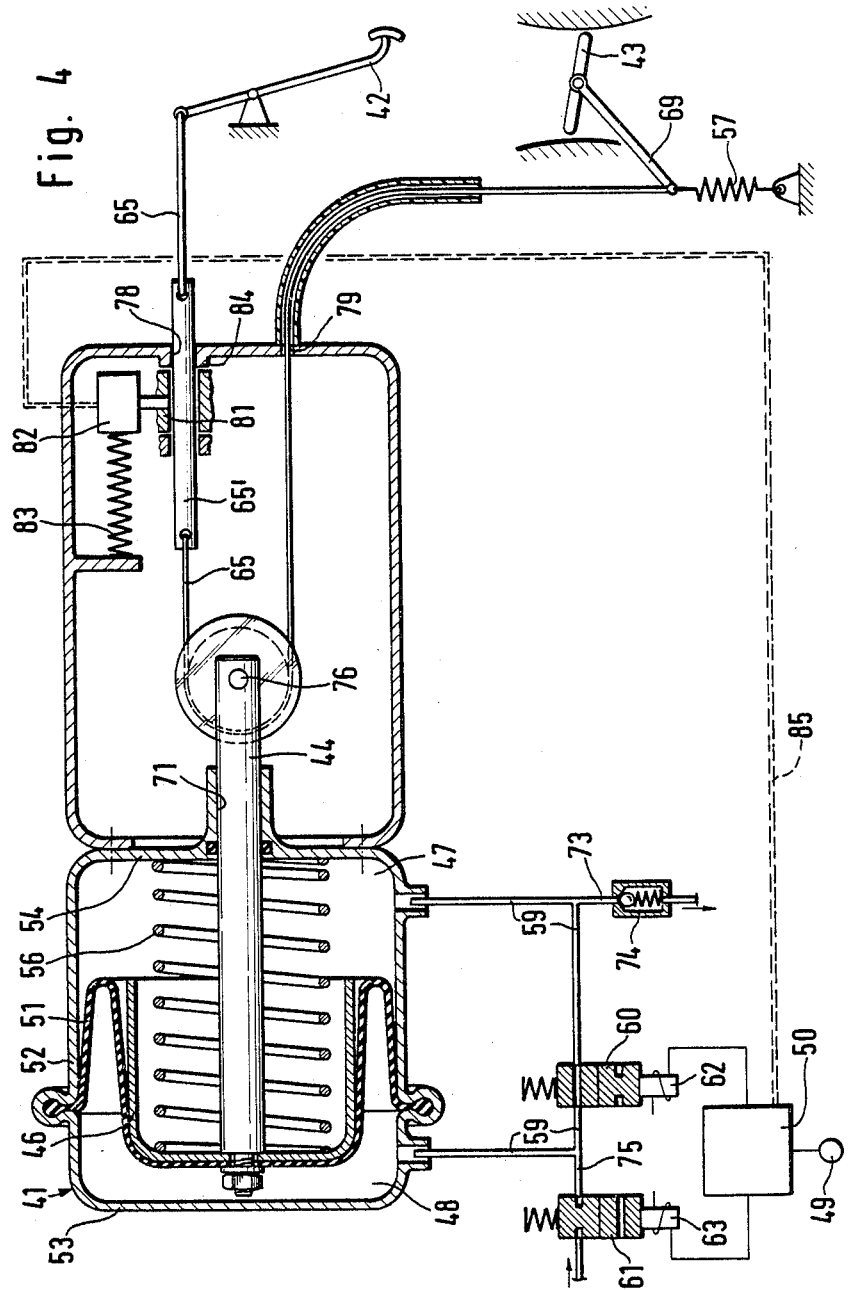

TRACTION SLIP CONTROL DEVICE

BACKGROUND OF THE INVENTION

The present invention relates to a traction slip control device comprising a sensor which responds to a beginning slip condition on at least one of the driving wheels to provide a slip signal and, a control circuit which, via an auxiliary drive, actuates the throttle valve of the drive engine in the closing sense when the sensor feeds a slip signal to the control circuit.

It is a purpose of these devices that, upon the occurrence of spinning of one of the driving wheels, the throttle-opening forces exerted by the accelerator pedal are overridden in the sense that, on beginning wheel slip, continued opening of the throttle valve as an inevitable consequence is avoided, or, to eliminate wheel slip, the throttle valve is adjusted in the closing direction by an amount required therefor. After wheel slip has been eliminated, the traction slip control device is set out of function again, whereupon the throttle valve will be acted upon by the accelerator pedal in the normal and conventional manner. In general, the control operations initiated by the sensor and the control circuitry are performed in a rhythmical way. That means the pressure application and the pressure relief, respectively, of the wheel cylinders takes place with a comparatively high sampling frequency. In consequence thereof, it is difficult to use simple piston-cylinder assemblies for the actuation of the accelerator linkage. Therefore, electric motors have been used so far for an intervention in the setting of the throttle valve.

SUMMARY OF THE INVENTION

The object of the present invention is to provide a traction control device using a fluid control element instead of the electric motors, while avoiding the permanent circulation of fluid. In addition, the traction slip control device is little susceptible to interference, does not have any lost travel and is stable and simple in design to permit economical manufacture.

The objects of this invention are achieved by providing a traction control device wherein the auxiliary drive is a hydraulic control element having a hydraulic cylinder and a hydraulic piston slidingly displaceably accommodated therein. Associated with the piston is a piston rod which sealedly exits from a bore in an end wall of the cylinder and which is coupled to the actuating linkage of the throttle valve in such a manner that on introduction of a hydraulic pressure into the cylinder chamber containing the piston rod, the piston rod acts on the throttle valve in the closing sense. On the side of the piston opposite the piston rod, there is provided a rod assembly which is operated by the accelerator pedal. A compensating spring is located on the opposite side of the piston which, when the accelerator pedal is maintained in a predefined position, permits the movement of the piston under the influence of the hydraulic control pressure in the direction of the rod assembly so as to move the throttle valve in the closing direction.

Conveniently, a tension element is interposed, in parallel to the compensating spring, between the end of the actuating rod and the hydraulic piston, which tension element permits the compensating spring to have a preload and to space the actuating rod a maximum distance from the hydraulic piston under axial tensile load on the tension element. In this arrangement, however, the tension element is required to be designed and, respectively, supported so as to not exert any pressure forces on the actuating rod and the hydraulic piston when these members are approaching each other.

Because of the described arrangement, a power track extends through the hydraulic cylinder for the transmission of the pedal forces onto the throttle valve. However, because of the axial clearance between the actuating rod and the hydraulic piston and the compensating spring interposed therebetween, the accelerator pedal may be overridden by the hydraulic pressure developed at the hydraulic piston in the event of a traction slip control action. That is, the throttle valve can be shifted far enough in the closing direction that slip of the driving wheel or driving wheels is avoided.

A preferred embodiment of this invention is characterized in that the rod assembly comprises an actuating rod which does not pressure-tightly extend through a bore in the end wall of the cylinder remote from the piston rod. The accelerator pedal is coupled to the extending end of the actuating rod and on depression of the accelerator pedal the actuating rod is slid into the cylinder, and it is connected to the piston via the compensating spring.

A guiding piston which is slidingly, but not pressure-tightly accommodated in the cylinder is preferably secured to the end of the actuating rod disposed in the interior of the cylinder and the compensating spring, subjected to the necessary preload, extends between the hydraulic piston and the guiding piston.

In order to properly guide the movable parts, it is furthermore suitable to have a guiding rod extend axially from the side of the hydraulic piston remote from the piston rod up to the actuating rod and to have it engage via a cross pin into an axially extending elongated hole of the actuating rod in such a manner that, when the hydraulic piston is not applied by hydraulic pressure, the compensating spring spaces the hydraulic piston and the guiding piston so far from one another that the cross pin abuts on the end of the elongated hole close to the piston. On pressurization of the hydraulic piston and on compression of the compensating spring the pin will displace more or less in the elongated hole.

In an embodiment having particularly small lost travel, the piston rod of the piston-cylinder assembly is inserted into the linkage between accelerator pedal and throttle valve and a compensating spring is interposed between the piston rod and the accelerator pedal. The cylinder chambers disposed on either side of the piston are pressure-balanced in the absence of a slip signal supplied by the sensor.

With this embodiment of the invention it is possible to entirely do without a decoupling arrangement between the piston-cylinder assembly and the accelerator linkage. As a result there is provided a simpler and fail-safe compact design and the lost travel which is normally included in a coupling/decoupling action will be avoided completely.

Because the piston is moved on each movement of the accelerator pedal, it is especially important that the friction forces and hydrodynamic forces occurring on displacement of the piston are kept at a minimum level. This is achieved according to a one embodiment in that the piston is sealed in the cylinder by means of a rolling diaphragm.

It is a purpose of the compensating spring to limit the forces applied on the piston rod by the accelerator pedal in such a way that the piston-cylinder assembly is able to easily override the actuating forces exerted by the accelerator pedal. It is also ensured in this manner that, when the accelerator pedal has adopted a constant position, the piston-cylinder assembly is able to adjust the throttle valve in the fashion defined by the sensor and the electronic circuit.

It is also a benefit for the reduction of the resistance forces occurring on normal accelerator pedal application, if the piston is biased by a weak resetting spring toward the inactive position which it adopts when the throttle valve is closed.

Furthermore, it is expedient if the throttle valve is biased toward its closed position by a retraction spring. Herein, it is the retraction spring that is normally provided in every accelerator linkage which serves this purpose. Owing to the latter spring, the weak resetting spring at the piston actually would not be required.

To keep the resistance forces developing on normal actuation of the accelerator linkage negligible, it is furthermore suitable to have the piston-cylinder assembly work pneumatically. On a normal accelerator-pedal actuation, only gases, not hydraulic fluids, are moved.

A particularly advantageous practical embodiment is characterized in that the cylinder chamber on the throttle side is connected to a vacuum source.

It is favorably arranged for that the vacuum prevailing at the piston-cylinder assembly is within a range of about 0.5 to about 0.7 bar and, more particularly, approximately 0.6 bar.

Especially in this embodiment, it is an advantage if the two cylinder chambers are interconnected by a pneumatic line containing a closing valve. This closing valve is opened in the normal case, i.e. in the absence of a slip signal, so that the two cylinder chambers are pneumatically connected on each normal actuation of the accelerator linkage. This way, displacement of the piston on every actuation of the accelerator linkage causes the air existing in the two cylinder chambers to correspondingly move to and fro through the pneumatic line and the closing valve. However, since the two cylinder chambers are connected to the vacuum in the normal case, scarcely any flow resistances will develop thereby. That is, the flow resistances which are reduced already by using air as a force-transmitting means are reduced still further by connecting both cylinder chambers to the vacuum during normal accelerator-linkage actuations.

The application of the piston-cylinder assembly with force can be performed in a particularly simple fashion without necessitating any special pressure source such that the cylinder chamber close to the accelerator pedal is connected via an opening valve to the atmosphere.

It is a special advantage if the closing valve and the opening valve are actuated by electronmagnets which, via the control circuitry, are acted upon by the sensor such as to switch over in the event of traction slip control. With this embodiment it is preferred to use solenoid valves, and the atmospheric pressure is shut off from the associated cylinder chamber in the normal case. In the event of traction slip control, both valves will change over, in consequence whereof only one of the cylinder chambers continues to be connected to the vacuum, while the other one is connected to the atmosphere.

Another feature of this invention resides in that secured to the piston rod of the piston-cylinder assembly is at least one pulley-block-like deviation roller. Extending around the roller is a flexible tension element that is in operative engagement with the accelerator pedal and with the throttle valve. Upon the occurrence of a slip signal, the piston displaces the piston rod and shortens the loop of the tension element, which loop is defined by the deviation roller.

It is to be seen in that the type of pulley block mounted into the accelerator linkage includes a movable deviation roller which is coupled with the piston rod of the piston-cylinder assembly. In the simplest and preferred embodiment, there is provision of only one single deviation roller so that a double pulley block is caused. However it is also possible to provide on the piston rod two or more juxtaposed movable deviation rollers which are opposed by counter rollers on the cylinder. That is the instant invention is not meant to be restricted to the use of one single pulley block, but includes the arrangement of multiple pulley blocks between the piston rod and a part on the cylinder. The pulleys extend at least in the area of the deviation roller in the direction of the piston rod.

The advantage of this embodiment is to be seen in that, on normal actuation of the accelerator linkage, only the deviation roller on the piston rod, and not the piston rod and the pistons themselves, must be displaced so that, even when a hydraulic piston-cylinder assembly is used, no hydrodynamic or friction forces have to be overcome on each normal accelerator linkage actuation.

While it is expediently provided in this embodiment that the throttle valve is biased toward its closed position by a retraction spring, no compensating spring is interposed between the accelerator pedal and the deviation roller. All the same, a closing movement of the throttle valve is permitted to take place in a specific fixed position of the accelerator pedal, because a corresponding displacement of the piston rod caused by the piston-cylinder assembly results in shortening of the loop formed by the deviation roller and the tension element. This shortening enables a closing movement of the throttle valve without any repositioning of the accelerator pedal.

Although the friction problem is not of major significance in this embodiment of the invention, it is herein expedient, too, that the piston is sealed relative to the cylinder by a rolling diaphragm.

A difference between the first and second embodiments is that the resetting spring of the piston takes a stronger effect on the piston rod than the retraction spring of the throttle valve. That means, the resetting spring of the piston is of a major functional significance in this solution, since it must prevent any displacement of the piston or of the piston rod from the inactive position on each normal actuation of the accelerator linkage.

Due to the force reduction by the pulley block, the resetting spring is required to generate an amount of force at least twice as much as the retraction spring of the throttle valve in the simplest case of a double pulley block. In pulley blocks having more than two pulleys, the resetting force of the resetting spring must be increased by corresponding whole multiples.

Although the second solution of the object of this invention would also permit hydraulic operation without problem, it is still expedient to have the piston-cylinder assembly operate pneumatically for reasons of ease of utilization of existing power sources.

In order to avoid any force being exerted on the piston in its inactive position, it is provided that the cylinder chamber close to the deviation roller is connected to a vacuum source.

Further, it is suitable if the two cylinder chambers are interconnected by a pneumatic line containing a closing valve.

Finally, a straightforward application of force can be provided by connecting the cylinder chamber remote from the deviation roller via an opening valve to the atmosphere. Likewise in this solution, it is appropriate to actuate the closing valve and the opening valve by means of electromagnets which, via the control circuitry, are acted upon by the sensor such as to change over in the event of traction slip control.

This second embodiment is also arranged so that the vacuum applied to the piston-cylinder assembly is within a range of about 0.5 to about 0.7 bar, more particularly, approximately 0.6 bar.

Another feature of this invention resides in that the accelerator pedal is fixed in its instantaneous position upon the occurrence of a traction slip signal. This can be effected in that a drive-actuable clamping member is disposed on the tension element between the deviation roller and the accelerator pedal. The clamping member is connectible via the drive with the tension element and which, in its unclamped condition, is held by a retaining spring in abutment on a stop arranged on the side of the accelerator pedal. The drive communicates via a control line with the control circuitry in such a manner that the drive will connect the clamping member with the tension element upon the occurrence of a traction slip signal.

A particularly compact arrangement will be achieved if the clamping arrangement is accommodated in the same housing as the deviation roller.

Suitably, the stop is provided at the bore for the tension element.

According to a practical embodiment, the drive is an electromagnetically actuated stroke cylinder.

To provide a particularly effective fixation of the accelerator pedal upon the occurrence of a traction slip signal, a rigid rod is interposed in the flexible tension element in the area of the clamping member. The clamping member which is e.g. of hollow-cylindrical design is preferably slidingly guided on said rigid rod. The rigid rod is required to be so long as to be able under all operating conditions to slide still within the clamping member and to move into engagement therewith.

The advantages of the above-mentioned embodiment include that there is no need for a coupling spring and there is no increase of the accelerator pedal actuating force. The arrangement is free from reactive effects. No coupling is required since the deviation roller is always in engagement with the piston rod. The clamping member fixes immediately the pedal in its momentary position in the case of a traction slip signal. Pedal depression beyond this point is impossible.

This invention uses a relatively small number of electric switching elements and of particular note it does not use a limit switch. The output for the coupling is actuated by the clamping member according to this invention. It is particularly important that, on release of the accelerator pedal, the throttle valve is moved in the closing direction, and, that is to say, even in the event of the clamping member being excited and connected with the tension element. In this case, the clamping member which is clampingly coupled with the tension element will lift from the stop on which it is normally abutting.

It is substantially impossible to accelerate through the piston rod more than is predetermined by the accelerator pedal.

BRIEF DESCRIPTION OF THE DRAWING

Four embodiments of the invention are illustrated in the accompanying drawings in which:

FIG. 2 is a schematic, partially cross-sectional view of another embodiment of a traction slip control device in accordance with this invention;

FIG. 3 is another embodiment of a traction slip control device for automotive vehicles, likewise in a schematic, partially cross-sectional view; and FIG. 4 is another embodiment of this invention.

DETAILED DESCRIPTION OF THE INVENTION

Figure 1:
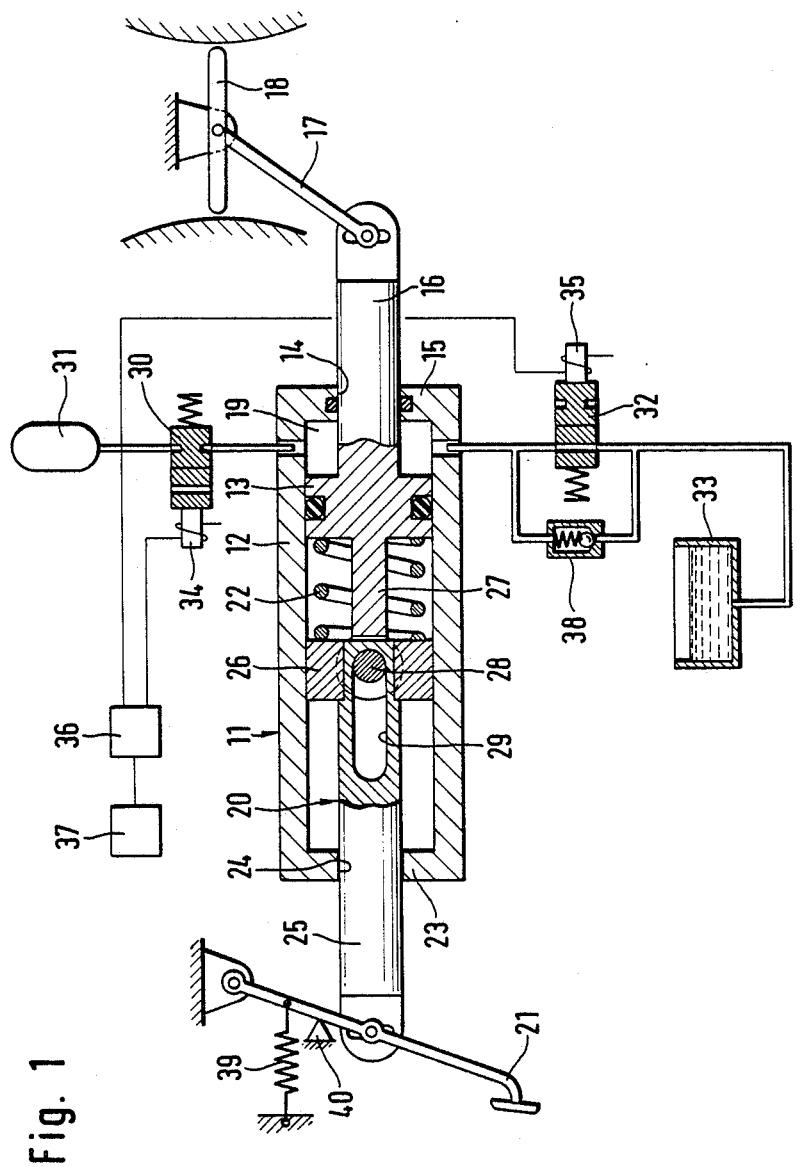
FIG. 1 is a partial block diagram view and partially cross-sectional view of one embodiment of a traction slip control device in accordance with this invention.

In the drawing, a hydraulic piston 13 is accommodated axially slidably in a cylinder 12 of a hydraulic control element 11. On the right-hand side of the Figure, a piston rod 16 extends from the piston 13 pressure-tightly through a bore 14 in the right end wall 15 of the cylinder 12 and is coupled to the actuating linkage 17 of a schematically indicated throttle valve 18 of the drive engine of an automotive vehicle. The closed position of the throttle valve 18 is illustrated. When the piston rod 16 moves to the right in the Figure, the throttle valve 18 is swivelled in the opening direction.

A pressure source 31 is connected via an opening valve 30 to the cylinder chamber 19 formed between the hydraulic piston 13 and the end wall 15 and a return reservoir 33 also communicates with the cylinder chamber 19 via a closing valve 32. The actuating electromagnets 34, 35 of the valves 30 and 32, respectively, are actuated by a control circuit 36 which, in turn, receives a slip signal from a slip sensor 37. When the sensor 37 detects the beginning of slip on at least one of the driving wheels of the vehicle, this is signalled to the control circuit 36 which will then correspondingly rhythmically open the opening valve 30 connected to the pressure source 31 and close the closing valve 32 connected to the return reservoir 33. A non-return valve 38 is still connected in parallel to the closing valve 32.

On the side of the hydraulic piston 13 opposite the piston rod 16, a guiding rod 27 is axially secured and comprises at its free end, a cross pin 28 engaging into an elongated hole 29 that is provided at the front end of an actuating rod 25. The actuating rod 25 penetrates slidingly, but not pressure-tightly, into a bore 24 in the left end wall 23 of the cylinder 12.

The front end portion of the actuating rod 25 is connected with a slide designed as guiding piston 26. Extending between the guiding piston 26 and the hydraulic piston 13 is a biased compensating spring 22. The actuating rod 25 and the guiding rod 27 are correspondingly offset sideways and are of fork-like design to enable them to axially overlap each other in the fashion seen in FIG. 1.

The operation of the traction slip control device illustrated in FIG. 1 is as follows.

Provided the valves 30, 32 are in their non-actuated position to be seen from the drawing, i.e., the valve 30 is closed and the valve 32 is open, the cylinder chamber 19 is connected to the return reservoir 33, and the accelerator pedal 21 can move the throttle valve 18 in a normal way in the opening and closing direction via the rod assembly 20, the piston 13, the piston rod 16 and the actuating linkage 17. The closing movement can be caused by a schematically indicated tension spring 39 which retracts the accelerator pedal to bear against a schematically indicated stop 40, i.e. to the position shown in the drawing.

As soon as the sensor 37 senses slip, the control circuit 36 will switch the valves 30, 32 cyclically so that valve 30 is open and valve 32 is closed. Pressure develops in the cylinder chamber 19 and moves the hydraulic piston 13 to the left, when viewed in the drawing. This results in a closing movement of the throttle valve 18, provided the latter had previously been shifted more or less in the opening direction by the accelerator pedal 21.

Even if now the accelerator pedal 21 is pushed down vigorously, the piston 13 is able to move to the left because the compensating spring 22 is able to compress, with the pin 28 displacing to the left in the elongated hole 29. That is, the hydraulic pressure is in a position to override the accelerator pedal 21 so that the throttle valve 18 is moved in the closing direction corresponding to the slip occurring.

If, however, the accelerator pedal 21 is released, the throttle valve 18 will continue to move toward its closing position under the additional influence of the resetting spring 39. The pin 28 will move into abutment on the right-hand end of the elongated hole 29.

Instead of using the pin 28 and the elongated hole 29, the actuating rod 25 and the guiding rod 27 could also be slidable telescopically in one another. With this arrangement at least one of the said two rods should be slidingly guided by the guiding piston 26 within the cylinder 12.

According to FIG. 2, the accelerator pedal 42 of a non-illustrated automotive vehicle is connected via an articulated rod 68 and a compensating spring 45 to the piston rod 44 of a piston-cylinder assembly 41. The piston-cylinder assembly 41, comprises a cylinder 52 having two axially opposite end walls 53, 54. The piston rod 44 extends sealedly through axial openings 70 and 71, respectively, in said end walls.

Inside the cylinder 52, the piston rod 44 comprises an annular step 72 in such a manner that the piston rod 44 is of a somewhat smaller diameter on the side close to the accelerator pedal than on the side close to the throttle valve 43.

The part of the piston rod 44 exiting from the opening 70 is articulated to a rod 67, at the end of which remote from the piston rod 44 a retraction spring 57 designed as a tension spring is engaging as well as an articulated lever 69 which is anti-torsionally connected with the throttle valve 43 of a non-illustrated combustion engine.

The interior of the cylinder 52 houses a bowl-shaped piston 46 which is immovably coupled to the piston rod 44 in the area of the annular step 72. The bowl-type rim 46' of said piston 46 extends axially to the throttle-side end wall 53 of the cylinder 52 and is in abutment thereon for limitation of the movement of the piston 46 in this direction and for the definition of its inactive position which is shown in FIG. 2.

The external diameter of the piston 46 is significantly less than the internal diameter of the cylinder 52. For sealing between the piston 46 and the cylinder 52, there is provision of an annular rolling diaphragm 51 which is sealingly connected radially inwardly with the piston 46 and radially outwardly with the 52.

The piston 46 and the rolling diaphragm 51 subdivide the inner space of the cylinder 52 into two pressure-tight cylinder chambers 47 and 48.

Intermediate the piston 46 and the pedal-side end wall 54 of the cylinder 52, there is provided a resetting spring 55 which is rated as weak as possible. It is only necessary for the resetting spring 55 to be strong enough to just be able to overcome the friction forces necessary for the resetting of the piston 46.

The two cylinder chambers 47, 48 are interconnected by a pneumatic line 59 connected to them and containing a closing valve 60 which is designed as a solenoid valve actuated by an electromagnet 62.

Further, the cylinder chamber 47 close to the throttle is applied via a pneumatic line 73 and a non-return valve 74 to a vacuum source 58 which can be provided e.g. by the suction side of the non-illustrated combustion engine.

Cylinder chamber 48 is in addition connected via a pneumatic line 75 to an opening valve 61, the inlet side of which is connected to the outer atmosphere and which is designed as a solenoid valve actuated by an electromagnet 63.

The electromagnets 62, 63 are connected to control circuitry 50 which receives a slip signal from a slip sensor 49 which delivers a slip signal to the control circuitry 50 in dependence upon a traction slip occurring at one of the drive wheels.

The operation of the traction slip control device illustrated in FIG. 2 is as follows.

In the normal case, i.e. when no slip signal is issued by the sensor 49, the cylinder chambers 47, 48 are interconnected through the line 59 and the now open closing valve 60. On actuation of the accelerator pedal 42, the piston rod 44 can be easily moved to and fro together with the piston 46. Owing to the use of the diaphragm 51, the friction forces between the piston 46 and the cylinder 52 are minimal and the flow resistances are small because, air is used as pressure medium, and, also because the gas flowing to and fro between the cylinder chambers 47 and 48 has a reduced density due to the two cylinder chambers 47, 48 being connected to the vacuum source 58.

Actuation of the accelerator pedal 42 drives the throttle valve 43 via the piston rod 44 in the opening or closing sense, respectively. The compensating spring 45 is dimensioned such as to practically not become extended upon these normal actuations.

In the event of slip occurring at any one of the drive wheels when the accelerator pedal 42 is depressed, the sensor 49 will issue a slip signal which causes the control circuitry 50 to apply a switching signal to the electromagnets 62, 63, in consequence whereof the closing valve 60 closes and the opening valve 61 opens. Now only the cylinder chamber 47 is still connected to the vacuum source 58, while the cylinder chamber 48 is connected to the outside atmosphere. As a result, a pressure develops in the chamber 48 and acts on the piston 46 and provides a force directed to the left toward the throttle valve 43 in FIG. 2. The piston rod 44 is thus moved to the left so that the throttle valve 43 twists in the closing direction. In this arrangement, the spring 45 extends in case the accelerator pedal 42 is retained by the driver in the set position or is depressed still farther.

As soon as the traction slip is terminated, the sensor 49 will signal this to the control circuitry 50 which subsequently drives the electromagnets 62, 63 so that the valves 60, 61 will be able to switch back again to the position shown in FIG. 2. Now, again the vacuum is prevailing at the cylinder chamber 48 so that the force re-adjusting the throttle valve 43 disappears and the throttle valve 43 is allowed to re-open under the influence of the accelerator pedal 42. This switching operation is repeated rhythmically until at last the traction slip has ultimately vanished and a normal actuation of the accelerator pedal is ensured.

In FIG. 3, like parts have been assigned like reference numerals as in FIG. 2.

According to FIG. 3, the piston rod 44 rigidly coupled to the piston 46 extends sealedly from the cylinder 52 only through an opening 71 disposed in the end wall 54 and carries there a deviation roller 64 which is rotatable around an axis 76 standing vertically on the piston rod 44, i.e., transverse to the axis of the piston rod. The end of the piston rod 44 and the deviation roller are accommodated in a housing 77 which is rigidly coupled to the cylinder 52.

From the accelerator pedal 42, a tension element, say a Bowden cable 65, extends through a bore 78 to the deviation roller 64, in a direction parallel to the longitudinal extension of the piston rod 44. The tension element 65 encloses the deviation roller 64 by 180° and projects then from another bore 79 of the housing 77. From there, the tension element 65 extends via a bend 80 or other tension element-guide means, if need be, to the actuating lever 69 of the throttle valve 43 which again is biased in the closing direction by a retraction spring 57 designed as a tension spring.

Due to this design, the tension element 65 passing around the deviation roller 64 forms a loop 66 which can be diminished by axial displacement of the piston rod 44 out of the position shown in FIG. 3.

The pneumatic actuation, i.e. switching of the piston-cylinder assembly 41 according to FIG. 3 takes place analogously to the embodiment of FIG. 2. In contrast to the embodiment according to FIG. 2, however, the resetting spring 56 of the piston 46 is designed to be so strong as to override the effect of the retraction spring 57.

The operation of the traction or anti-slip control device illustrated in FIG. 3 is as follows.

Because of the strong design of the resetting spring 56, the piston rod 44 and the piston 46 will not move at all on normal actuations of the accelerator pedal 42. The throttle valve 43 is opened and closed by the movement of the tension element 65 around the deviation roller 64 depending on whether the accelerator pedal 42 is depressed or released. Upon each actuation of the accelerator pedal 42, the deviation roller 64 will turn in the one or in the other direction.

If a slip signal is delivered by the sensor 49 during actuation of the accelerator pedal, the change-over of the closing valve 60 and of the opening valve 61 takes place in the fashion described with respect to FIG. 2, and atmospheric pressure is applied to the cylinder chamber 48. Now the piston 46 is displaced in the direction of the deviation roller 64 while the resetting spring 56 is compressed. Consequently, the surface of the piston 46 and, respectively, the pressure must be chosen to be of corresponding magnitude.

Upon this displacement of the piston 46, the deviation roller 64 will move in the direction of the accelerator pedal 42, the loop 66 being decreased. This has as a result that, when the accelerator pedal 42 retains the same position, the throttle valve 43 is repositioned in the closing direction corresponding to the decrease of the loop 66 under the effect of the retraction spring 57. This causes elimination of the traction slip, at which time the sensor 49 causes the control circuitry 50 to switch the valves 60, 61 back to the positions shown in FIG. 3. This valve switching operation is repeated herein also for as long as until the traction slip is finally eliminated.

As soon as the valves 60, 61 have re-adopted the position shown in FIG. 3, the resetting spring 56 will urge the piston 46 back into the inactive position shown in FIG. 3 irrespective of the position of the accelerator pedal 42 or the throttle valve 43.

An advantage of the embodiment according to FIG. 3 resides in that despite there being no need for a switchable coupling between the piston-cylinder assembly 41 and the accelerator linkage, the piston 46 and the piston rod 44 do not have to displace on normal actuation of the throttle valve 43.

In the embodiments of FIGS. 2 and 3 it can be seen that the piston-cylinder assembly 41 is permanently coupled to the accelerator linkage so that disturbances which might possibly be entailed by engagement and disengagement of a coupling are eliminated. Thus there will not be any lost travels in the event of traction slip control.

The embodiment according to FIG. 4 generally corresponds to FIG. 3 except that an accelerator-pedal position-fixing device is provided, by means of which the depressed accelerator pedal is maintained in the position it just adopted when a traction slip control signal is issued. However, this fixation is performed only in one direction in such a fashion that further depression of the accelerator pedal is precluded. In contrast thereto, on release of the accelerator pedal, the throttle valve performs an unhindered movement in the closing direction so that it is always possible to throttle down the engine.

For this purpose, a rigid circular-cylindrical rod 65' is inserted into the tension element 65 in the area of the bore 78 in the housing 77. On the rod 65' a hollow-cylindrical clamping member 81 is arranged so that normally the rod 65' can slide therein. An electromagnetically actuated stroke cylinder 82 is associated with the clamping member 81 to move it into clamping engagement with the rigid rod 65'. The unit composed of the stroke cylinder 82 and the clamping member 81 is biased by a retaining spring 83 in the direction of the bore 78. The retaining spring 83 is supported on the housing 77. The clamping member 81, the stroke cylinder 82 and the spring 83 are accommodated in the housing 77 and urged against an annular stop 84 encompassing the bore 78.

The stroke cylinder 82 is connected via a control line 85 with the control circuitry 50.

The function of the embodiment described in FIG. 4 is as follows:

Provided that the control circuitry 50 does not issue any traction slip signal, the stroke cylinder 82 assumes the position to be seen from the drawing in which it disengages the clamping member 81 from the rigid rod 65'. The retaining spring 83 retains the construction unit composed of clamping member 81 and stroke cylinder 82 in abutment on the axial stop 84. In the event of conventional actuations of the accelerator pedal 42, the rigid rod 65' moves correspondingly within the clamping member 81 without being hindered in its movement by the clamping member 81.

As soon as traction slip is detected by the sensor 49, the control circuitry 50 issues a traction slip signal to the valves 60, 61 and to the stroke cylinder 82. In consequence thereof, the latter will bring the clamping member 81 into clamping engagement with the rigid rod 65' so that now the clamping member 81 and the stroke cylinder 82 are rigidly coupled to the rod 65'. Because the clamping member 81 abuts on the stop 84 further depression of the accelerator pedal 42 is precluded. By suitably displacing the deviation roller 64, the throttle valve 43 may now be actuated in a sense opposing the traction slip. The driver is, however, able to throttle down the engine by reducing the force applied on the accelerator pedal 42. This is because in this event the retraction spring 57 exerts a resetting force on the tension element 65, while the clamping member 81 clampingly engaged with the rod 65' and the stroke cylinder 82 are lifted from the stop 84 and compress the retaining spring 83. That is to say, it is important that the retaining spring 83 is dimensioned just so much that it is able to retain the clamping member 81 in the unclamped condition on the stop 84. However, the retaining spring 83 is required to be considerably weaker than the retraction spring 57.

As soon as the traction slip signal on the control circuitry 50 disappears, the stroke cylinder 82 is reset to its inactive position, whereby the clamping member 81 is disengaged from the rod 65'. The deviation roller 64 is now moved into its initial position again. Subsequently, the accelerator pedal can be actuated in a conventional manner in both directions.

Driving the clamping member 81 can be effected electrically, pneumatically, hydraulically or in any other suitable fashion.

The clamping member 81 can be realized structurally by a cylindrical sleeve having a piston-like wall portion which is actuated radially by the stroke cylinder 82.

What is claimed is:

1. A traction slip control device for use with an automotive vehicle, said device comprising a sensor for detecting a beginning slip condition on at least one of the driving wheels of the vehicle and for issuing a slip signal when such condition is detected, an auxiliary drive for actuating the throttle valve of the vehicle drive engine in the closing sense and a control circuit responsive to said slip signal for operating said auxiliary drive, said auxiliary drive comprising a hydraulic control element having a hydraulic cylinder and a hydraulic piston slidable therein, a piston rod extending from a bore in an end wall of the cylinder and being coupled to an actuating linkage associated with the throttle valve, a cylinder chamber adjacent said piston for reserving hydraulic pressure which causes said piston rod to act on said actuating linkage to operate the throttle valve in the closing sense, a rod assembly located on the side of said piston opposite said piston rod and being operative by an accelerator pedal in the vehicle, a compensating spring between said piston and said rod assembly which permits movement of the piston under the influence of hydraulic pressure in said chamber for moving said piston and said piston rod toward said rod assembly and for moving said actuating linkage to close the throttle valve, wherein the rod assembly comprises an actuating rod which extends through a bore in an end wall of the cylinder opposite the piston rod for connection to the accelerator pedal in the vehicle, said actuating rod being slidable into the cylinder, the end of the actuating rod disposed inside the cylinder being connected via said compensating spring to said piston, a tension element arranged between the piston and the actuating rod and in parallel relation with said compensating spring for maintaining a predetermined bias of the compensating spring without inhibiting compression of the compensating spring; and wherein a guiding piston is slidingly accommodated in the cylinder and is affixed to the end of the actuating rod inside the cylinder, said compensating spring extending between said hydraulic piston and said guiding piston.

2. A device as claimed in claim 1, wherein said tension element comprises a guiding rod extending axially from the side of the hydraulic piston opposite the piston rod to the actuating rod, said guiding rod being connected with said actuating rod in a longitudinally slidable manner, said guiding rod having a cross pin received in an axially extending elongated hole on the actuating rod in such a manner that, when the hydraulic piston is not receiving hydraulic pressure, the compensating spring will space the hydraulic piston and the guiding piston so far from one another that the cross pin abuts on the end of the elongated hole close to the piston, while on pressurization of the hydraulic piston and when the compensating spring is compressed, the pin will displace in the elongated hole.

* * * * *